United States Patent
Kumar et al.

(10) Patent No.: US 7,233,597 B2
(45) Date of Patent: Jun. 19, 2007

(54) HIGH SPEED PARSER

(75) Inventors: Pamela Kumar, Bangalore (IN); Cyril John Chemparathy, Bangalore (IN); Mohit Sharma, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 1062 days.

(21) Appl. No.: 10/361,752

(22) Filed: Feb. 11, 2003

(65) Prior Publication Data

US 2004/0156371 A1    Aug. 12, 2004

(51) Int. Cl.
*H04L 12/28* (2006.01)
(52) U.S. Cl. .................. 370/401; 370/469; 370/392
(58) Field of Classification Search ............... None
See application file for complete search history.

(56) References Cited

U.S. PATENT DOCUMENTS 6,940,814 B1 *    9/2005    Hoffman ................. 370/235

* cited by examiner

*Primary Examiner*—Chi Pham
*Assistant Examiner*—Ronald Abelson
(74) *Attorney, Agent, or Firm*—Steven A. Shaw; W. James Brady; Frederick J. Telecky, Jr.

(57) ABSTRACT

A high speed parser containing a content addressable memory (CAM) providing select values to multiplexers. The CAM is programmed to implement search rules which examine input data for specific semantics according to a protocol, and outputs the specific bit positions at which the corresponding desired data units are present. The outputs are provided to multiplexers to cause the desired data units to be selected on the corresponding output paths of the multiplexors.

30 Claims, 5 Drawing Sheets

HIGH SPEED PARSER

RELATED APPLICATION

The present application is related to the U.S. application Entitled, "Multiplexer", Ser. No. 10/361,751, filed on Feb. 11, 2003, currently U.S. Pat. No. 6,825,706, naming as inventors: Kumar et al, and assigned to common assignee.

BACKGROUND OF THE INVENTION

1. Field of the Invention

The present invention relates to integrated circuits, and more specifically to a method and apparatus for quickly parsing a packet.

2. Related Art

Parsers are generally used to determine data portions of interest in a sequence of bits. Typically, the bits are examined according to a pre-specified convention (protocol) to determine the data portions of interest. For example, a parser may be used in a router (example of a device) to determine data portions such as destination address and type of service parameters in a received IP packet as is well known in the relevant arts.

In a prior approach, a device may implement a parser substantially in the form of software instructions in which the bits are generally examined sequentially according to a protocol to determine the specific bits of interest. For example, when parsing an IP packet, a parser may first examine the IP version number (e.g., version 4 or 6) and a header length to determine the specific bit positions at which a destination port number of interest is present.

One problem with such software implementations is that it may take a long time (or a large number of clock cycles) to parse data bits. Such long duration for parsing may be unacceptable in many environments. For example, with high speed technologies such as those based on optical fibre, packets may be received at a high frequency and it may be necessary to parse packets quickly (e.g., at "wire-speed"). Otherwise, the long parsing times may impede the throughput performance of a device processing the packets and the resulting long parsing times may be undesirable.

Therefore, what is needed are method and apparatus for parsing packets quickly.

SUMMARY

A parser according to the present invention receives input data according to a packet format, and generates data units of interest on corresponding pre-specified paths. The data units may be generated quickly even if the bit positions of the data units of interest can vary according to the protocol. In an embodiment, the parser contains a multiplexer and a content addressable memory (CAM) which controls the multiplexer as a N to 1 selector, the details of which are described below.

The multiplexer receives multiple inputs (contained within input data) and selects one of the inputs to generate a multiplexer output according to a select value. The content addressable memory (CAM) may be programmed with multiple search rules and associated output values to cause the appropriate select value to be provided to the multiplexer. The search rule and the associated output value is based on the bit positions at which the desired data unit is present in the input data according to the packet format. The multiplexer receives multiple inputs (contained within input data) and selects one of the inputs to generate a multiplexer output according to the select value.

Due to the use of the CAM for searching the input data according to the protocol, the parser may generate data units of interest quickly on the corresponding pre-specified output paths.

An implementation of the parser is based on a ternary CAM in which each search rule is implemented as a compare data and a mask. A search rule is determined to be a matching search rule if the input data matches the compare data at bit positions specified by the mask. Multiple output values may be associated with each search rule, and the output values may be provided as select values for a corresponding number of multiplexers. Hence, each output value of a search rule corresponds to a desired output field from the high speed parser.

An embodiment of a ternary CAM is configured to parse a packet according to Internet Protocol (IP). As the packet format varies depending on the version number (e.g., 4 or 6) of the IP, the search rules are designed to search according to a version number. In addition, some of the data units (e.g., destination port number of the following TCP/UDP header) may be dependent on a header length field. Accordingly, each search rule may be designed to search for a specific header length value and generate the appropriate select values.

Alternative embodiments may be implemented using other CAM technologies (e.g., binary CAM, range search CAM) depending on the available technologies and the specific parsing strategy that may need to be employed for a specific protocol/packet format or search rules. In addition, each CAM may contain multiple CAM units, with different CAM units being implemented using different CAM technologies (corresponding to the type of search operation required for different fields of the incoming stream of data).

According to another aspect of the present invention, a multiplexer may contain multiple cells driving a common output line through a switch controlled by the select value output from the multiplexer. Each cell receives (and stores) a bit ("input bit") of the multiple bits to be selected. The output line is first driven to a first logical value, and only one of the cells drives the output line to a second logical value (based on the output generated by the multiplexer) if the corresponding input bit does not equal the first logical value.

For example, the output line may first be driven to a logical value of 1, and a cell receiving a specific input may cause the output line to be driven to a logical value of 0 if the specific input equals 0. The specific one of the cells driving the output line may be determined by a select value received by the multiplexer. The remaining cells may not affect the output line irrespective of the corresponding input bits.

Each cell may contain a pair of switches (e.g., transistors) coupled in series between the output line and a pre-specified voltage level (e.g., ground). A first switch may be switched on according to a control signal (e.g., asserted according to select value) and a second switch may be switched on according to a bit stored by the cell.

The pair of switches cause the output line to be charged to a second logical level when the first bit has one logical value but does not change the first logical level on the output line if the first bit has another logical level. The output line may be shared by all the cells processing a corresponding bit of the different inputs, and only a control signal corresponding to only one of the multiple cells is set to one state and the control signal of the remaining ones of the multiple cells are set to another state according to the select value.

Hence, in operation, search rules may be stored into a CAM. An incoming data string is compared with all the rules and select values are output based on the matching rule. In parallel, the input data string is also stored in the multiplexer. The select value from the CAM-based rule table controls the multiplexer such that the appropriate field (or fields) of the input data is finally output from the multiplexer.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

FIG. (FIG.) 1 is a block diagram illustrating an example environment in which the present invention can be implemented.

DETAILED DESCRIPTION OF THE PREFERRED EMBODIMENTS

1. Overview and Discussion of the Invention

A parser in accordance with the present invention may contain a content addressable memory (CAM) and multiple multiplexers. Each multiplexer may provide one of the desired data units (e.g., bytes) on a corresponding output path. Each multiplexer may be provided as inputs all the possible values from which the one input is selected and provided on the corresponding output path. The content of the CAM may be configured such that the appropriate selection values are provided to the multiplexers for different combinations of input data to be parsed.

Thus, in an example scenario, at least a portion of an input data, which determines the packet format, is provided as an input to the CAM. At least the portions of input data which may be selected by each multiplexer are provided as inputs to the multiplexer. The output(s) of the CAM may then be provided as selection values to the multiplexers, which causes the multiplexers to generate the desired data units on the corresponding output paths.

As a result, each desired data unit may be caused to be provided on a pre-specified communication path by appropriate design of the CAM and the multiplexers. Accordingly, the combined circuit operates as a high speed parser.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
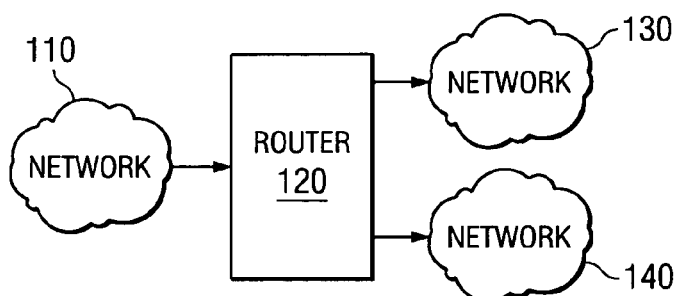

FIG. 1 is a block diagram illustrating an example environment in which the present invention can be implemented. The environment is shown containing networks 110, 130 and 140, and router 120. Router 120 represents an example system in which the present invention can be implemented. However, the invention can be implemented in other devices such as web cache servers, traffic sniffers, load balancing devices. Each system of FIG. 1 is described in further detail below.

Each of the network 110, 130 and 140 may contain multiple machines and routers. The machines may communicate with each other, and router 120 may provide the connectivity between machines in different networks.

Router 120 represents an example device in which the present invention can be implemented. For illustration, it is assumed that router 120 receives packets from one network at high speed and needs to quickly extract different fields of interest to process the packets at high speed (e.g., wire-speed). For example, some of the fields may be needed to search a routing table. Parsing generally refers to determining the location of the specific fields according to the packet format. Special challenges are presented if the packet format permits the position of the fields to change. The manner in which the present invention enables packets to be parsed quickly is described below with reference to FIG. 2.

3. Router

Figure 2:
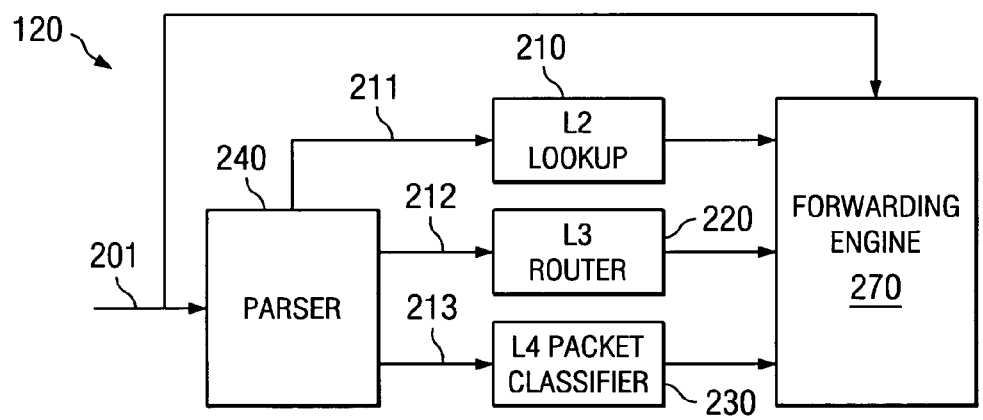
FIG. 2 is a block diagram illustrating the embodiment of a router provided in accordance with the present invention.

FIG. 2 is a block diagram illustrating the details of an embodiment of router 120 (an example of a system) according to an aspect of the present invention. Router 120 is described as receiving and processing TCP/IP packets encapsulated in Ethernet format for illustration. However, router 120 can be designed to operate in several other environments, as will be apparent to one skilled in the relevant arts based on the disclosure provided herein. Router 120 is shown containing layer2 (L2) lookup 210, layer3 (L3) router 220, layer4 (L4) packet classifier 230, parser 240, and forwarding engine 270. Each component is described below in greater detail.

Forwarding engine 270 receives packets on input path 201, and processes the packets according to various decisions made by layer2 lookup 210, layer3 router 220, layer4 packet classifier 230. For example, for non-IP packets, forwarding engines may operate as a layer-2 bridge. For IP packets, IP routing may be performed. For at least some of the IP packets, the processing (or forwarding) may depend on layer-4 determinations performed by layer4 packet classifier 230.

In general, the implementation of forwarding engine 270 depends on the type of packet to be processed, the medium/protocols using which packets are sent and received, and the different services (e.g., higher priority to HTTP packets) that may need to be provided to different packets depending on various inputs. Forwarding engine 270 may be implemented in a known way.

It should be appreciated that forwarding engine 270 represents an example processing block, and parsers generally need to be implemented to provide the information needed by the processing blocks to provide a desired utility. In addition, processing blocks need to be designed taking into consideration the specific output path on which a corresponding desired data unit of interest will be provided.

Layer2 lookup 210 may receive layer-2 information (e.g., An Ethernet protocol type and Ethernet destination address) on path 211, and determine the manner in which the corresponding packet is to be forwarded. In an embodiment, layer-2 lookup 210 may indicate on path 217 that a received packet is simply to be bridged if the packet is not an IP packet. Layer2 lookup 210 may further indicate the specific port (not shown) on which the packet is to be forwarded. In response, forwarding engine 270 causes router 120 to operate as a bridge in a known way.

Layer3 routing 220 may receive layer-3 information (e.g., a destination address) and determine the specific port on which a corresponding packet is to be forwarded at least for some protocols (e.g., IP having a value of 0x800 in the Ethernet protocol type field). The specific port to be forwarded may be determined according to a routing table, and the corresponding information may be communicated to forwarding engine 270.

Layer4 packet classifier 230 may receive layer-4 information (e.g., port numbers in TCP/UDP packets) and determine the manner in which a corresponding packet is to be processed. In an embodiment, the layer-4 information is used to implement fire-walls (or perform filtering operation, in general). In another embodiment, the layer-4 information is used to determine whether a HTTP packet is to be forwarded to a local web cache (not shown). In response, forwarding engine 270 may process the packet accordingly.

Blocks 210, 220 and 230 are described as operating on data of only a corresponding one of the layers for simplicity. However, blocks may be implemented to use data in multiple layers as may be necessary consistent with the design requirements. In addition, implementation of blocks examining other layers will also be apparent to one skilled in the relevant arts based on the disclosure provided herein. Such embodiments are contemplated to be within the scope and spirit of various aspects of the present invention.

Parser 240 parses the input data received on path 201 to provide each desired data unit on a corresponding output path according to a pre-specified convention. Thus, the layer-2, layer-3 and layer-4 portions of information are provided on (pre-specified bit positions) paths 211, 212 and 213 respectively. Parser 240 may need to provide the corresponding data units on the corresponding paths (outputs) quickly.

The manner in which a parser may quickly parse packets is described below in further detail. However, it is helpful to understand the operation of an example CAM to appreciate the details of parsing implemented in accordance with the present invention. Accordingly, the operation of an example CAM are described first with reference to FIG. 3.

4. Content Addressable Memory(CAM)

Figure 3:
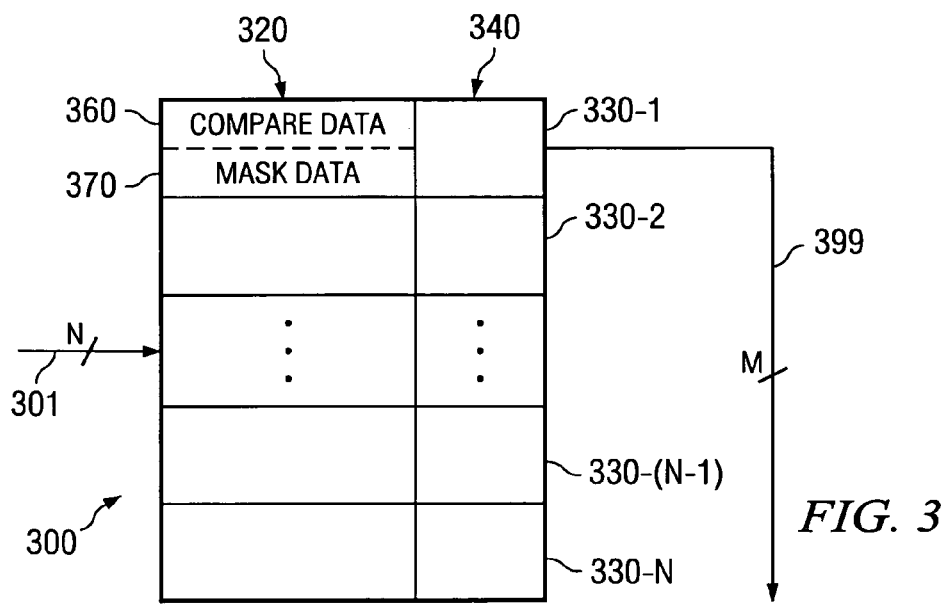
FIG. 3 is a block diagram illustrating the internals of an embodiment of a ternary content addressable memory (CAM) provided in accordance with the present invention.

FIG. 3 is a block diagram illustrating the details of an embodiment of a ternary content addressable memory (TCAM) 300. In general, a CAM generally refers to a memory in which the data is retrieved from a memory location according to a comparison of input data with the content of the memory. CAMs are generally distinguished from random access memories (RAM) in that RAMs receive an address as an input and generate an output at a memory location specified by the output. The manner in which a TCAM can be used is described below.

Broadly, TCAM 300 is configured with data and masks forming 'search rules'. The manner in which search rules can be implemented in the context of ternary CAMs is described in sections below with examples. When input data is provided on input path 301, TCAM 300 generates on path 399 an output data stored associated with a search rule matching the input data as described below in further detail.

TCAM 300 is shown containing search field 320 and output field 340 organized in the form of multiple rows 330-1 through 330-N. The search field in each row may in turn contain compare data 360 and associated mask 370. The compare data and mask in each row form a search rule.

In operation, when input data is provided on path 301, the input data is compared with the compare data (on a bit by bit basis) in each row at the positions specified by the mask in the same row. If a match is detected at all the compared positions of a row, the data in the corresponding output field 340 is provided on path 399. As may be appreciated, the comparison of each row may be viewed as a search, and the comparison data along with the corresponding mask forms a search rule.

While the embodiments are described with reference to TCAMs for illustration, it should be understood that other types of CAMs (depending on the needs of the specific environment and availability of the products) may also be used to parse data in accordance with various aspects of the present invention. Examples of such CAMs include range match CAM, prefix match CAM, etc. The implementation of such alternative embodiments will be apparent to one skilled in the relevant arts based on the disclosure provided herein, and are contemplated to be within the scope and spirit of various aspects of the present invention.

In addition, while a CAM is described as being implemented using a single unit (TCAM 300), alternative embodiments may be implemented which use multiple units, with different units generating the byte positions for different fields. Each of the units may be implemented with different technology (ternary CAM, range match CAM, etc.) as is suited to parse the specific packet formats for the desired fields.

In general, the implementation of search rules depends on the specific type of features provided by the corresponding type of CAM unit. The manner in which TCAMs can be used to parse a received packet is described below in further details with reference to FIG. 4.

5. Parser

Figure 4:
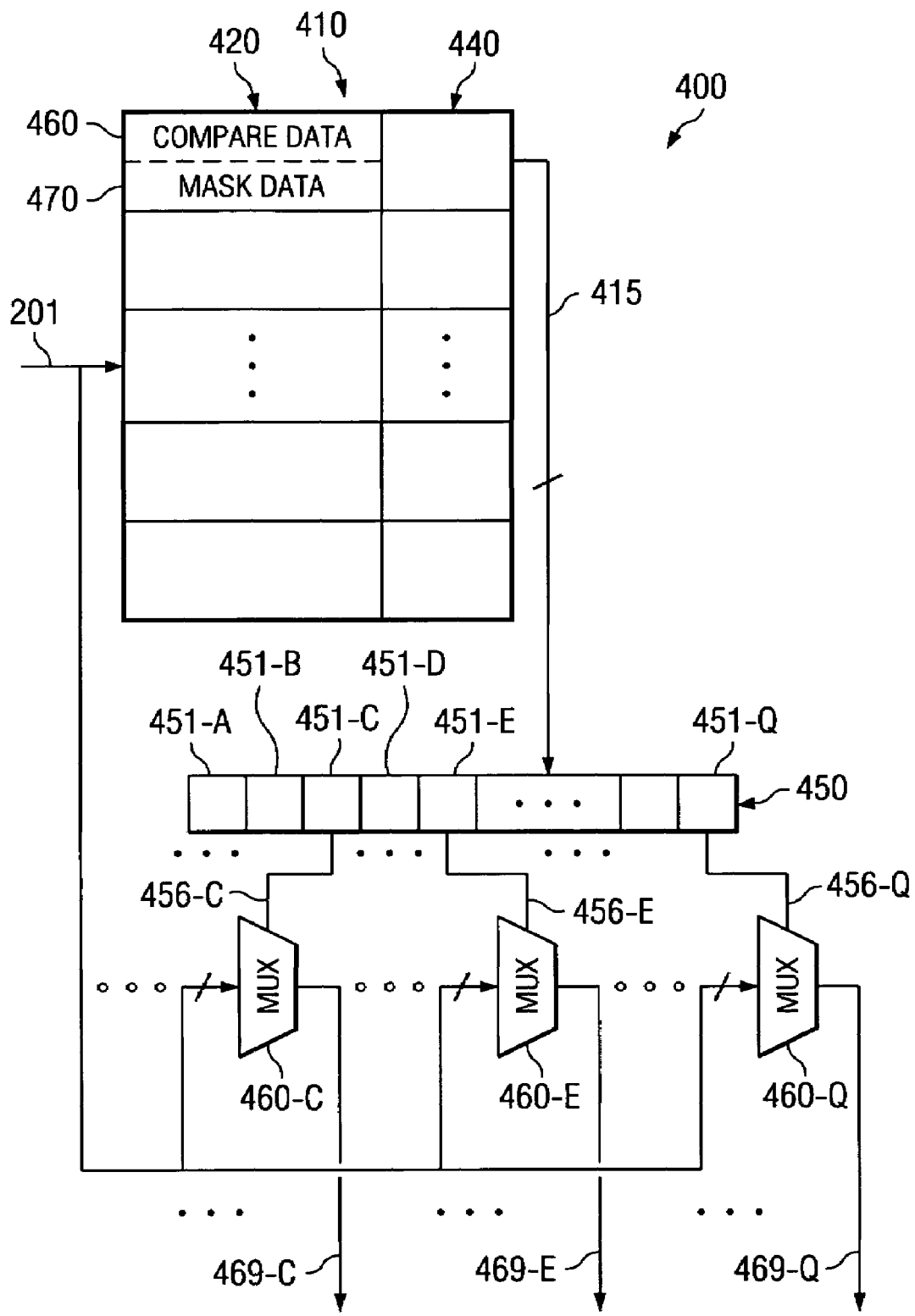
FIG. 4 is a block diagram illustrating the details of an embodiment of a parser.

FIG. 4 is a block diagram illustrating the details of an embodiment of parser 400. Parser 400 is shown containing CAM 410, output register 450, and multiplexers 460-A through 460-Q. Only the representative components and interconnections are shown for clarity. The components are described below.

Output register 450 stores the output data received on path 415, and provides the control values to multiplexers 460-A through 460-Q using the received data. Output register 450 may be logically viewed as containing Q partitions (portions) 451-A through 451-Q, with each partition providing a control value (on paths 456-A through 456-Q) to the corresponding multiplexer.

The width of each partition (and thus the width of paths 456-A through 456-Q) generally depends on the number of inputs provided to a corresponding multiplexer. In an embodiment, each multiplexer receives all the 128 bits of parsed data as inputs, and thus the widths of each partition equals 7 bits. However, optimizations may be performed to determine the specific possible inputs from which each output (of multiplexer) needs to be selected, and multiplexers may be designed only with the required inputs. In such a situation, the width of each partition may be minimized.

Each of the multiplexers 460-A through 460-Q selects one of the corresponding connected inputs according to the corresponding control value 456-A through 456-Q respectively. Multiplexers 460-C, 460-E and 460-Q are respectively shown providing the selected data on output paths 469-C, 469-E, and 469-Q, which may respectively be contained in paths 211, 212, and 213 of FIG. 2. Each output path generates one of the desired fields, and the specific field selected by each multiplexer is determined by the corresponding control value received from output register 450.

CAM 410 receives input data to be parsed on path 201, and generates the control values (used for selection by multiplexers 460-A through 460-Q) on path 415 according to the stored values (configured search rules and associated output data/control values). CAM 410 may also contain compare data field 460, mask data field 470 and output field 440, which respectively operate similarly to the corresponding fields 360, 370 and 340 of FIG. 3.

In general, the input data is compared with the bits in each data field only at positions specified by corresponding mask, and the value in the corresponding (same row) output field is provided as output to be stored in output register 450. Each value (in portions 451-A through 451-Q respectively) in output register 450 in turn controls the corresponding specific bit positions (or field) of data selected from the input data received on path 201. For example, if partition 451-C contains a value of 10, byte 10 of the input data may be selected on path 469-C. Similarly, if partition 451-Q contains a value of 76, byte 76 of the input data may be selected on path 469-Q.

In general, each path 469-A through 469-Q can be made to generate a corresponding desired pre-specified field in input data on path 201 by appropriate programming of CAM 410, even if the positions of the fields can change according to a pre-specified protocol. Thus, it may be appreciated that CAM 410 needs to be programmed consistent with the protocol format of input data to be parsed and the design of the multiplexers selecting the desired data units. The description is continued with reference to TCP/IP protocol format illustrating the general considerations in programming the CAM.

6. TCP/IP Format

Only the details of TCP/IP protocol as relevant to an understanding of some the described embodiments are provided herein. For further information on TCP/IP protocol format, the reader is referred to documents entitled, "RFC 0791—Internet Protocol" and, "RFC 0793—Transmission Control Protocol", available at www.ietf.org, and are both incorporated in their entirety herewith.

In general, each data unit of interest may be present in specific bit positions or in different bit positions depending on the manner in which protocol is defined. For example, the destination IP address would be available in bytes 30–33 at least for version 4 IP. On the other hand, the destination port number may start at byte positions 36, 40, 44, 48, . . . , 76 (in IP version 4) depending on the header length.

CAM 410 may be programmed with search rules and the associated output values to determine the correct byte positions for data units of interest in input data. In general, the search rules for each data unit of interest need to be implemented taking into consideration various combinations of possible byte positions consistent with the protocol format. The manner in which CAM 410 may be programmed for the IP protocol Version 4 (and the destination address and port numbers described above) is described below.

7. Programming the CAM

Figure 5:
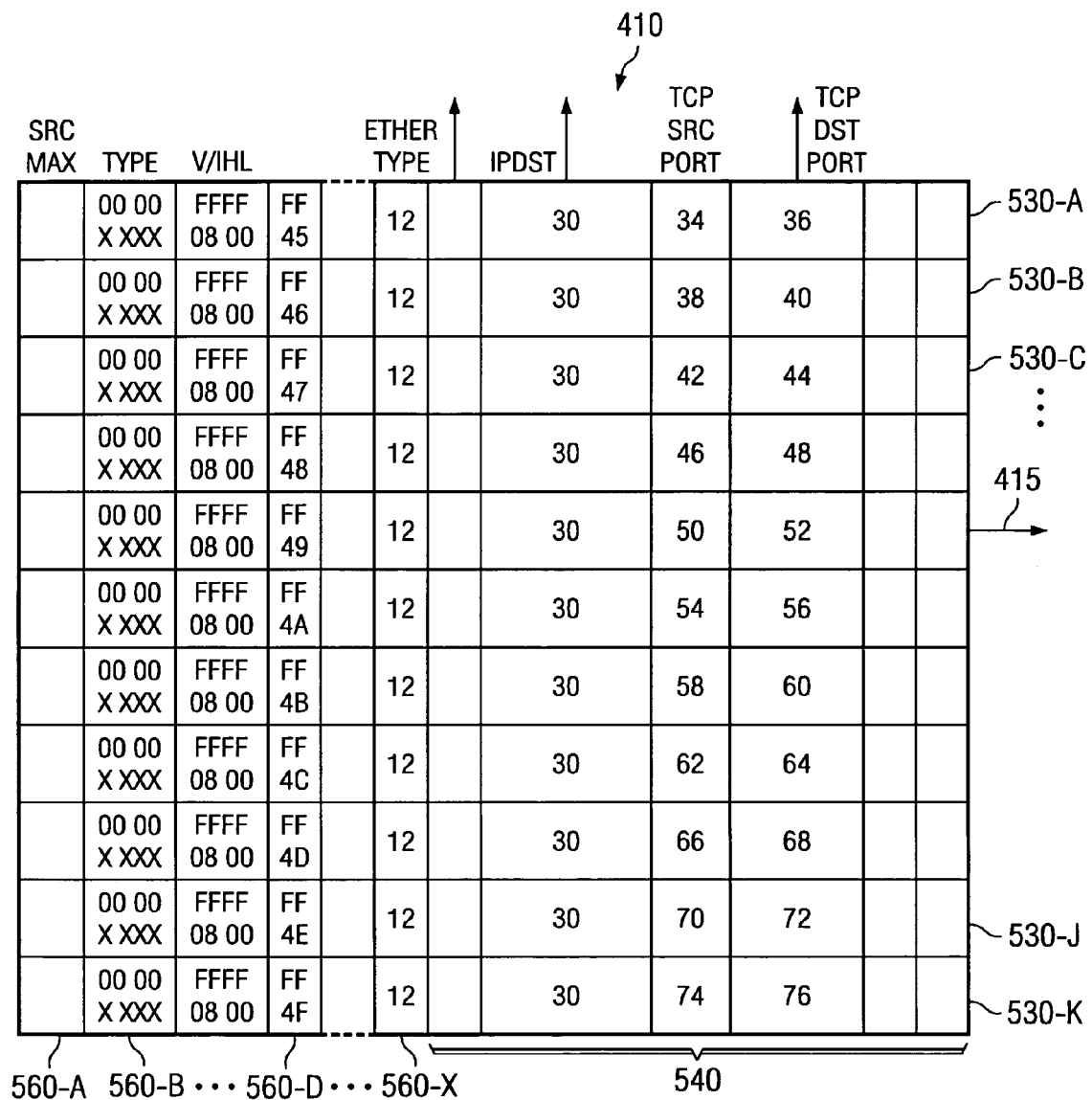
FIG. 5 is a block diagram illustrating the manner in which input data may be compared with the search rules.

FIG. 5 depicts the content of CAM 410 illustrating the manner in which search rules can be implemented and the matching output can be generated according to an aspect of the present invention. For the purpose of illustration and conciseness, it is assumed that parser 400 needs to generate data representing the Ethernet protocol type, IP destination address, TCP source port number and TCP destination port number only.

By analyzing the TCP/IP protocols, it may be appreciated that the IP version and header length fields determine the specific byte locations of the source port number. In IP version 4, the source port number may be present in byte location 34 for header length of 5 respectively. Accordingly, the input data needs to be searched according to the header length and version number to determine the specific byte position for the source port number. On the other hand, the byte positions are fixed for an IP protocol type and destination address.

The manner in which CAM 410 can be programmed to perform the corresponding searches on input data is described now. CAM 410 is shown containing several rows (530-A through 530-K) and columns (560-A through 560-X). Each row implements a search rule as described below with several examples.

Row 530-A searches for packets of IP version 4 and having a value of 5 in header length field since columns 560-C and 560-D respectively contain compare data values 0x0800 and 0x45, with the corresponding mask bits set to 1. Output field 540 in row 530-A is shown containing values 12, 30, 34 and 36 which respectively equal the byte position of Ethernet protocol type, IP destination address, TCP source port and TCP destination port in case of IP version 4 and header length value of 5.

The remaining search rules are described with reference to row 530-A for conciseness. In all the search rules, column 560-C contains the same value as all the corresponding searches are designed for IP protocol. However as searches are designed for header length 5 through F, column 560-D contains values ranging from 45 –4F (4 representing IP version 4) in different rows.

The description is continued with a few examples illustrating the operation of parser 400 when CAM 410 is programmed as described above with reference to FIG. 5.

8. Examples

Consider an example in which input data specifies version 0x04 and header length 0x07 (i.e., value of V/IHL is 0x47) and type of protocol is IP (i.e., value is 0x0800). The value of input data matches only the search rule specified by row 530-C. As a result, CAM 410 sends the corresponding values (i.e., 12, 30,42 and 44) in output field on path 415. The values cause the corresponding multiplexers to select data units starting at byte positions 12, 30, 42 and 44 accurately reflecting the Ethernet protocol type, IP destination address, TCP source port, and TCP destination port fields in the case of IP version 4 and header length value of 7.

In case of an input data containing 0x4E for IP version/ header length fields, the search rule specified by row 530-J is matched and corresponding output field values (12,30,70 and 72) are forwarded as select values to the corresponding multiplexers 460 on output path 415. In general, a select value indicates the specific one of the inputs the corresponding multiplexers needs to select. The data units starting at byte positions 12, 30, 70 and 72 are selected (and provided as outputs of parser 400) reflecting the Ethernet protocol type, IP destination address, TCP source port and TCP destination port.

While CAM 410 is described as providing selection values for fields which do not change position in a packet (e.g., Ethernet Type starts at byte number 12 counted starting from 0), alternative embodiments can be implemented with improvements which do not compare data related to such fixed fields. In such a case, the data values in the fields can potentially bypass both the parser and the multiplexer, and be provided directly to the subsequent blocks (e.g., 210, 220) with appropriate buffering.

As described above, parser 400 contains several multiplexers 460-A through 460-Q. It may be desirable to implement multiplexers while satisfying several requirements. The description is continued with reference to an example implementation of multiplexer 460-C. The description may be applicable to other multiplexers as well.

9. Multiplexer

An aspect of the present invention allows multiplexer 460-C to be implemented while minimizing the number of transistors (and thus potentially circuit area and power consumption). The details of an embodiment of multiplexer 460-C are provided in FIG. 6, which is shown selecting one of two inputs, with each input containing four bits (nibble) each. The first nibble is shown containing bit D00, D10, D20, D30, and the second nibble is shown containing bits D01, D11, D21, D31 The manner in which multiplexer 460 can be implemented to select one of the two inputs is described below with reference to FIG. 6.

Figure 6:
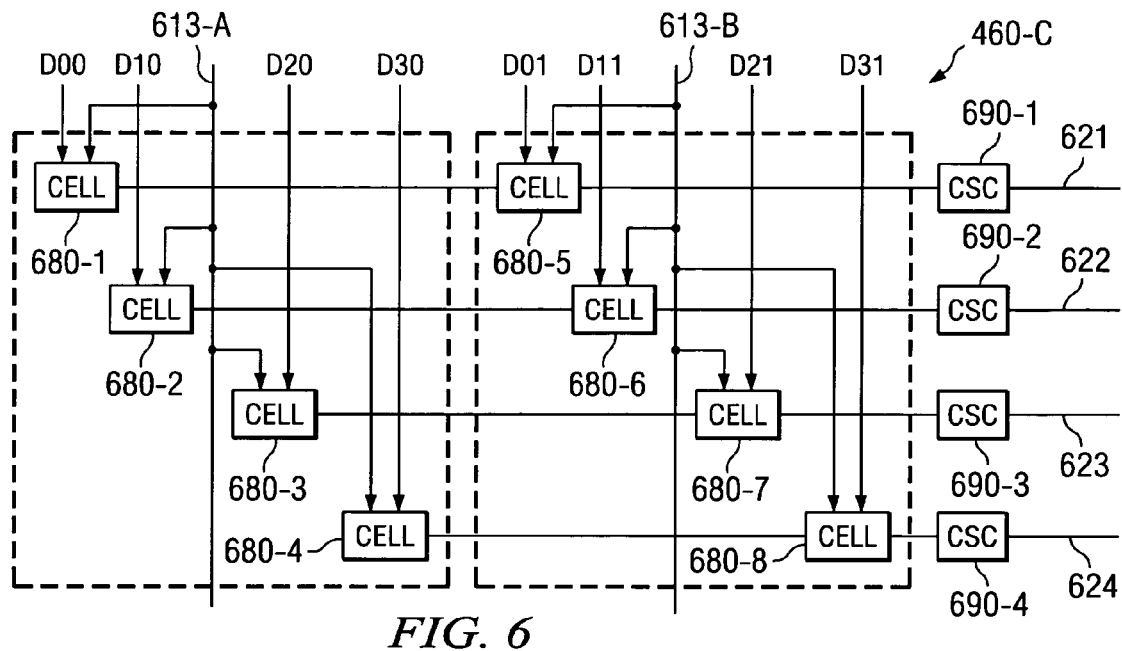
FIG. 6 depicts a logical model of an embodiment of multiplexer which selects one of two inputs for a 4-bit field.

FIG. 6 depicts the details of multiplexer 460-C as containing eight cells 680-1 through 680-8, and four charge and sense circuits 690-1 through 690-4. A first group containing cells 680-1 through 680-4, which receive bits D00, D10, D20, and D30 respectively. A second group containing cells 680-4 through 680-7, which respectively receive bits D01, D11, D21, and D31.

The (cells in) two groups respectively are controlled by control lines 613-A and 613-B. Only one of the control lines (even assuming more than two control lines) is at one logical value (e.g., 1) and the remaining control lines are at the other logical value. Only one of the control lines may be asserted in a known way based on the control value generated on path 415 by CAM 410. The bits in the group receiving the control line are generated on output lines 621–624 respectively.

For example, if a multiplexer select value equals 0, only line 613-A may be asserted to 1 causing bits D00 through D30 to be provided on output lines 621–624 respectively. Each cell 680-1 through 680-4 processes an input bit and causes the corresponding bit to be provided on the connected output line if the input control bit is asserted.

Charge and sense circuits (CSC) 690-1 through 690-4 are respectively connected to output lines 621-624. Each charge and sense circuit performs any necessary actions prior to or after the bits are selected on output lines 621-624, consistent with the design of the cells. Example embodiments of cells and charge and sense circuits are described below in further detail.

10. Cell

Figure 7:
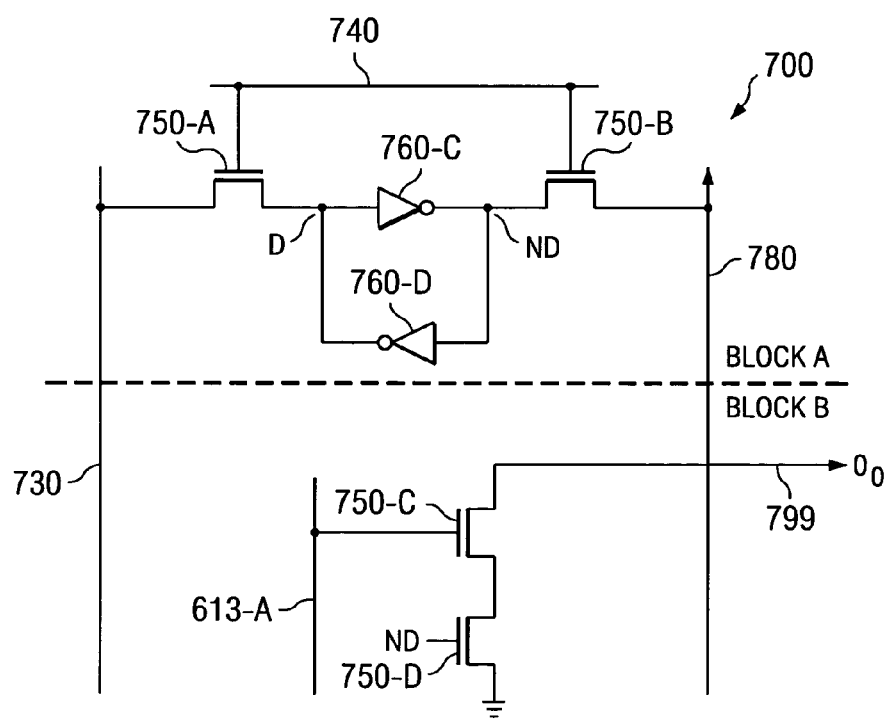
FIG. 7 is a circuit diagram illustrating the details of cell 700 in an embodiment of the present invention.

FIG. 7 is a circuit diagram illustrating the details of cell 700 in an embodiment of the present invention. Cell 700 may correspond to any of the cells 680-1 through 680-8. As noted above, each cell may be used to process an input bit of a multiplexer. Cell 700 is shown containing two blocks, Block-A and Block-B. The two blocks are described below in further detail.

Broadly, block-A illustrates the manner in which an input bit received on path 730 (contained in 201 of FIG. 2) can be stored locally. Block-B illustrates the manner in which the bit may be selected on output line 799 (contained in path 461-C) according to select values generated by CAM 410. The blocks are described below in further detail.

Block-A receives a data bit (e.g., D00 of FIG. 6) to be stored on input bit line 730 and the inverted bit on line 780. When write enable line 740 is asserted, N-MOS transistors 750-A and 750-B are switched on (conduct) causing the data bit to be stored in latch formed by inverter gates 760-C and 760-D. The latch may be implemented in a known way.

Block-B is shown containing two N-MOS transistors 750-C and 750-D, control signal 613-A and shared line 799. As noted above, block-B operates to drive shared line 799 to a bit value stored by block-A (specifically, the latch therein). Each component of block-B is described below in further detail.

It may be appreciated that control signals (including 613-A') may be generated from the select values specified for the corresponding multiplexer. In an embodiment, a select value of 101 in binary format (equal to 5 in decimal) may cause control signals of 0010 0000 to be generated, indicating that the 6$^{th}$ input is to be selected (and not the others). Accordingly, the bit corresponding to the sixth input would be provided on shared line 799 as described above.

It may be appreciated that translating a select value to multiple control signals generally enables CAM 410 (and bus 415) to be implemented with minimal width (number of bits). However, in situations such as when performance is of primary concern, CAM 410 may be implemented to generate control signals directly (using wider CAM), in which case select value is represented in the form of control signals. Many such alternative embodiments may be implemented without departing from the scope and spirit of the present invention as will be apparent to one skilled in the relevant arts based on the disclosure provided herein.

Continuing with the description of block-B of FIG. 7, the gate of N-MOS transistor 750-D is connected to the inverted value of bit (ND) stored in block-A. Thus, N-MOS transistor 750-D conducts when a value of 0 is received on input line 730 and stored in block-A. The gate of N-MOS transistor 750-C is shown connected to select signal 613-A, and thus transistor 750-C conducts when control signal 613-A is asserted. In general, the transistors represent switches which conduct upon receiving one value of an input and do not conduct upon receiving another value on the input.

Shared line 799 is shared by several cells (similar to 700) and is first charged to a high logical value (1). If none of the cells discharge the line, shared line 799 remains at high logical value. Only the specific cell (in a row, e.g., one of D00 and D01 in FIG. 6) selected according to the control signal/select value can discharge line 799.

In particular, with reference to block-B of FIG. 7, when both transistors 750-C and 750-D conduct, then shared line 799 is discharged to attain a low logical level. As described above, transistor 750-C conducts when control signal 613-A is asserted and transistor 750-D conducts when the bit stored in block-A equals 0.

Thus, when cell 700 is selected (as specified by control signal 613-A) and when D00 of FIG. 6 equals 0, shared line 799 is set to a low logical level (0). If D00 equals 1, transistor 750-D would not conduct, and thus shared line 799 would remain at 1. The other cells (e.g., that corresponding to D01) would not also drive shared line 799 to 0 since the corresponding select values/control signals would be set to 0.

The description is continued with respect to the manner in which shared line 799 may be charged to 1 and the manner in which output value may be evaluated by the corresponding charge and sensing circuits.

11. Charging and Sensing

Figure 8:
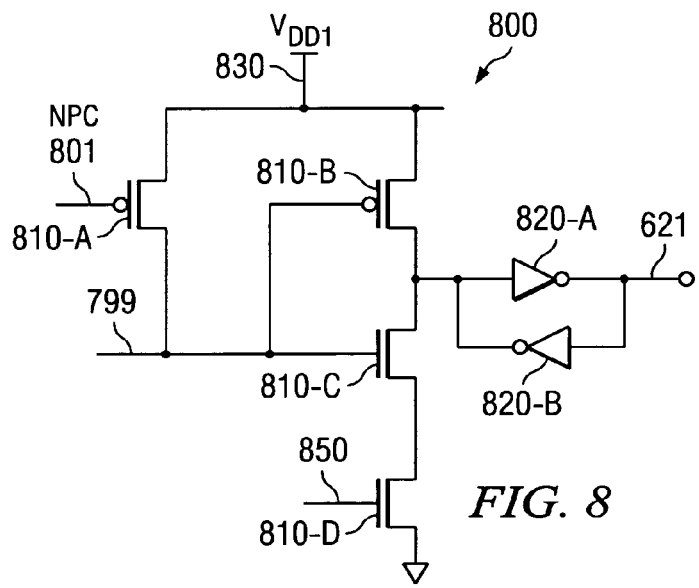
FIG. 8 is a circuit diagram illustrating the charge and sense circuit in an embodiment of the present invention.

FIG. 8 is a circuit diagram illustrating the charge and sense circuit 800 in an embodiment of the present invention. Charge and sense circuit 800 may correspond to any of the charge and sense circuits 690-1 through 690-4, even though the description is provided in relation to circuit 690-1. Charge and sense circuit 800 is shown containing two PMOS transistors (810-A and 810-B), two NMOS transistors (810-C and 810-D), a latch represented by two inventor gates 820-A and 820-B, charge initiate signal 801 and evaluation signal 850. The manner in which shared line 799 is charged and output value is evaluated on path 621 is described below.

Transistor 810-A conducts when gate input 801 is set to 0, causing shared line 799 to be charged. Evaluation signal 850 may be asserted to propagate the value on shared line 799 to output line 621 as described below. When evaluation signal 850 is not asserted, output line 621 remains at previous propagated value as also described below.

When evaluation signal 850 is asserted, shared line 799 may be either at 0 or 1. If a 0 is present, P-MOS transistor 810-B conducts, causing point 812 to be raised to 1. Latch containing back to back connected inventors 820-A and 820-B inverts the value at point 812, and stores the resulting 0 as desired. On the other hand, if shared line 799 is at 1, transistor 810-B is switched off and transistors 810-C and 810-D conduct, causing point 812 to be set to 0. The latch then provides a value of 1 on output line 612, as desired.

When evaluation signal 850 is not asserted, transistor 810-D does not conduct. As a result, the logical level of point 812 is not changed and the value on output 621 is not affected.

Thus, it may be appreciated that the approach of above can be used to implement a multiplexer while reducing a number of transistors compared to a conventional approach in which multiplexers are implemented using merely combinatorial logic gates (AND and OR gates). Many advantages such as reduced power consumption and die area (in implementations as integrated circuits) may be attained as a result.

In addition, the input to the parser can be different data than the data which is processed according to the results of the parsing operation. Also, the parser may be found to be useful in IPV6 type environments in which the packet format varies depending on the content of various fields. Thus, the present invention enables a high speed parser to be implemented efficiently for several types of environments.

It should be further understood that several modifications can be made to the described embodiments without departing from the scope and spirit of the present invention as will be apparent to one skilled in the relevant arts based on the disclosure provided herein. For example, NMOS transistors may be used instead of PMOS transistors. Similarly, CAM 410 can be implemented using several approaches as described below.

12. Pipelined CAM Architecture

Figure 9:
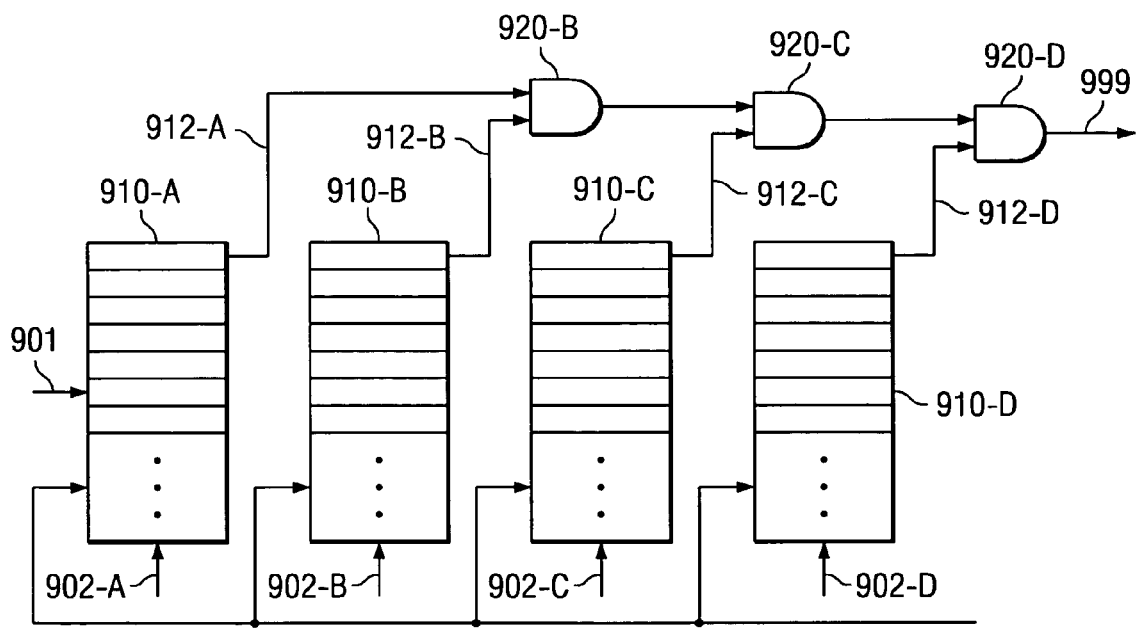
FIG. 9 is a block diagram illustrating the details of implementing CAM using pipelining techniques in an embodiment of the present invention.

FIG. 9 is a block diagram illustrating the manner in which CAM 410 can be implemented using pipelining techniques in an embodiment of the present invention. The block diagram is shown containing sub-CAMs 910-A through 910-D and logical AND gates 920-B through 920-D. The components are described below in further detail.

Each sub-CAM (910-A through 910-D) may contain multiple locations, with each location corresponding to a search rule implemented using CAM 410. As may be appreciated, each sub-CAM searches a portion of the search rule. For example, the first location of all the sub-CAMs 910-A through 910-D together implement the search rule in the first location of search field 420.

If there is a match in the first location (at the top) of sub-CAM 910-A, the output line 912-A is asserted to a logical value of 1, or else a 0 is asserted. Each location of the sub-CAMs may contain an output line, even though the output line for only the first location is shown for each sub-CAM.

Each AND gate (920-B through 920-D) performs a logical AND operation of an output line from a previous stage (910-A through 910-C respectively) and an output line of present stage (910-B through 910-D). AND gates may be provided associated with all the locations of the sub-CAMs, even though AND gates are shown associated with only the first locations.

Thus, line 999 (output of AND gate 920-D) may be asserted to a 1 only if a match is detected with the first location of all the four sub-CAMs. When line 999 is asserted to 1, the data in the corresponding output field (not shown) may be provided as multiplexer select values.

The pipelining techniques thus implemented may provide several advantages. For example, each sub-CAM may be implemented using a different technology (e.g., ternary, binary or range search) as is suitable to parse packets of a specific packet format of interest. In addition, the pipelining techniques may facilitate operation of parsers with shorter bus-widths.

For example, assuming CAM width equals 128 bytes, a bus of only 32 bytes may be used, and sub-CAMs may be implemented using 32 bytes bus. In such a scenario, input bus 901 may be 32 bytes wide, and carry four groups of 32-bytes of data in four successive clock cycles, and store strobes 902-A through 902-D may be asserted in the corresponding clock cycles.

In other words, the first 32 bytes of a packet may be provided as an input to sub-CAM 910-A by asserting only store strobe 902-A, and the next 32 bytes may be provided as an input to sub-CAM 910-B by asserting only strobe pulse 902-B, etc. In an embodiment, each bit of the sub-CAMs is implemented using SRAM bit cells well known in the relevant arts.

Multiplexers 460-A through 460-Q may also be implemented to operate with 32 byte bus. As may be appreciated, each multiplexer may contain 1024 cells (similar to the one shown in FIG. 7). The 1024 cells may be partitioned into four groups, with each group storing the bits received in the corresponding clock cycle.

With respect to FIG. 7, write enable line 740 for each cell may be enabled in only one of the four clock cycles. An appropriate AND logic may be used to enable each write enable signal in one of the four clock cycles depending on the specific partition in which the cell belongs. Such implementation will be apparent to one skilled in the relevant arts based on the disclosure provided herein.

13. Conclusion

While various embodiments of the present invention have been described above, it should be understood that they have been presented by way of example only, and not limitation.

Thus, the breadth and scope of the present invention should not be limited by any of the above described exemplary embodiments, but should be defined only in accordance with the following claims and their equivalents.

What is claimed is:

1. A parser receiving an input data according to a protocol, said parser generating a data unit of interest on a corresponding one of a plurality of paths, wherein the bit position in said input data of said data unit of interest can vary according to said protocol, said parser comprising:
   a multiplexer receiving a plurality of inputs, said multiplexer selecting one of said plurality of inputs to generate a multiplexer output according to a select value, said plurality of inputs being comprised in said input data; and
   a content addressable memory (CAM) programmed with a plurality of search rules, each of said plurality of search rules being stored associated with an output value, said CAM forwarding as said select value the output value stored associated with a matching search rule in response to receiving said input data, said matching search rule being contained in said plurality of search rules,
   wherein said output value associated with each search rule indicates a specific one of said plurality of inputs is to be selected according to a bit position at which said data unit of interest is located.

2. The parser of claim 1, wherein said CAM comprises a ternary CAM and each of said plurality of search rules comprises a compare data and a mask, wherein said matching search is determined depending on whether said input data matches the compare data at bit positions specified by the mask for each of said plurality of search rules.

3. The parser of claim 2, further comprising a plurality of multiplexers including said multiplexer, wherein a plurality of output values are stored associated with each of said plurality of search rules, wherein each of said plurality of output values is provided as a select value to a corresponding one of said plurality of multiplexers.

4. The parser of claim 3, wherein said input data comprises a packet according to Internet Protocol, wherein said search rules are designed to search according to a version number of said Internet Protocol.

5. The parser of claim 4, wherein some of said plurality of search rules are designed to search according to a header length field in said packet.

6. The parser of claim 1, wherein said multiplexer comprises a plurality of cells, wherein each of said plurality of cells is designed to select a specified bit of a plurality of bits, said specified bit being indicated by said select value, wherein each of said plurality of bits is contained in a corresponding one of said plurality of inputs, wherein a first cell is contained in said plurality of cells, said first cell comprises:
   an output initially charged to a first logical level; and
   a pair of transistors coupled in series between said output and a pre-specified voltage level, a first transistor being switched on according to a control signal and a second transistor being switched on according to a first bit stored by said first cell,
   wherein said pair of transistors cause said output to be charged to a second logical level when said first bit has one logical value but does not change said first logical level on said output if said first bit has another logical level,
   wherein said output is shared by said plurality of cells and only a control signal corresponding to only one of said plurality of cells is set to one state and the control signal of the remaining ones of said plurality of cells are set to another state according to said select value.

7. The parser of claim 6, wherein said first logical level comprises a 1 and said another logical level comprises a 0.

8. The parser of claim 7, wherein said pre-specified voltage level equals ground.

9. The parser of claim 8, wherein each of said first transistor and said second transistor comprises an NMOS transistor, and wherein the gate terminal of said another transistor is connected to an inverted value of said first bit.

10. The parser of claim 9, further comprising a charging circuit to charge said output initially to said first logical level.

11. The parser of claim 10, wherein said output comprises an output line.

12. The parser of claim 6, further comprising a latch storing said first bit.

13. The parser of claim 1, wherein said CAM is implemented as a plurality CAM units.

14. The parser of claim 13, wherein some of said plurality of CAM units are implemented using one type of CAM technology and some other of said plurality of CAM units are implemented using another type of CAM technology.

15. The parser of claim 14, wherein said one type of CAM technology comprises ternary CAM technology.

16. The parser of claim 13, wherein a first CAM unit and a second CAM unit respectively search a first portion and a second portion, wherein said first CAM unit and said second CAM unit are comprised in said CAM, and each of said first portion and said second portion comprise a field in said plurality of search rules, said parser further comprises an AND gate performing a logical AND operation of a first match signal and a second match signal.

17. The parser of claim 1, wherein each of said plurality of search rules is stored in a location comprised in said CAM, wherein said location comprises a first number of bits, wherein fewer than said first number of bits are stored in one clock cycle and some more bits are stored in a next block cycle in said CAM.

18. A device processing an input data, said device comprising:
   a parser examining said input data and generating a data unit of interest on a corresponding one of a plurality of paths, wherein the bit position in said input data of said data unit of interest can vary according to said protocol, said parser comprising:
      a multiplexer receiving a plurality of inputs, said multiplexer selecting one of said plurality of inputs to generate a multiplexer output according to a select value, said plurality of inputs being comprised in said input data; and
      a content addressable memory (CAM) programmed with a plurality of search rules, each of said plurality of search rules being stored associated with an output value, said CAM forwarding as said select value the output value stored associated with a matching search rule in response to receiving said input data, said matching search rule being contained in said plurality of search rules,
      wherein said output value associated with each search rule indicates a specific one of said plurality of inputs is to be selected according to a bit position at which said data unit of interest is located; and
   a processing block receiving said data unit of interest on said multiplexer output irrespective of the bit position of said data unit of interest in said input data.

19. The device of claim 18, wherein said CAM comprises a ternary CAM and each of said plurality of search rules comprises a compare data and a mask, wherein said matching search is determined depending on whether said input data matches the compare data at bit positions specified by the mask for each of said plurality of search rules.

20. The device of claim 19, further comprising a plurality of multiplexers including said multiplexer, wherein a plurality of output values are stored associated with each of said plurality of search rules, wherein each of said plurality of output values is provided as a select value to a corresponding one of said plurality of multiplexers.

21. The device of claim 20, wherein said input data comprises a packet according to Internet Protocol, wherein said search rules are designed to search according to a version number of said Internet Protocol.

22. The device of claim 21, wherein some of said plurality of search rules are designed to search according to a header length field in said packet.

23. The device of claim 18, wherein said multiplexer comprises a plurality of cells, wherein each of said plurality of cells is designed to select a specified bit of a plurality of bits, said specified bit being indicated by said select value, wherein each of said plurality of bits is contained in a corresponding one of said plurality of inputs, wherein a first cell is contained in said plurality of cells, said first cell comprises:
   an output initially charged to a first logical level; and
   a pair of transistors coupled in series between said output and a pre-specified voltage level, a first transistor being switched on according to a control signal and a second transistor being switched on according to a first bit stored by said first cell,
   wherein said pair of transistors cause said output to be charged to a second logical level when said first bit has one logical value but does not change said first logical level on said output if said first bit has another logical level,
   wherein said output is shared by said plurality of cells and only a control signal corresponding to only one of said plurality of cells is set to one state and the control signal of the remaining ones of said plurality of cells are set to another state according to said select value.

24. The device of claim 23, wherein said first logical level comprises a 1 and said another logical level comprises a 0.

25. The device of claim 24, wherein said pre-specified voltage level equals ground.

26. The device of claim 25, wherein each of said first transistor and said second transistor comprises an NMOS transistor, and wherein the gate terminal of said another transistor is connected to an inverted value of said first bit.

27. The device of claim 26, further comprising a charging circuit to charge said output initially to said first logical level.

28. The device of claim 27, wherein said output comprises an output line.

29. The device of claim 23, further comprising a latch storing said first bit.

30. The invention of claim 29, wherein said device comprises a router processing IP packets.

* * * * *